US012709160B2

(12) United States Patent
Minen et al.

(10) Patent No.: US 12,709,160 B2
(45) Date of Patent: Aug. 18, 2026

(54) METHOD FOR ELECTRIC VEHICLE SIMULATING COMBUSTION ENGINE BRAKING

(71) Applicant: FERRARI S.P.A., Modena (IT)

(72) Inventors: Melinda Minen, Modena (IT); Lorenzo Laraia, Modena (IT); Francesco Pretagostini, Modena (IT)

(73) Assignee: FERRARI S.P.A., Modena (IT)

( * ) Notice: Subject to any disclaimer, the term of this patent is extended or adjusted under 35 U.S.C. 154(b) by 464 days.

(21) Appl. No.: 18/335,249

(22) Filed: Jun. 15, 2023

(65) Prior Publication Data

US 2023/0406111 A1 Dec. 21, 2023

(51) Int. Cl.
*B60L 7/18* (2006.01)

(52) U.S. Cl.
CPC ........... *B60L 7/18* (2013.01); *B60L 2240/421* (2013.01); *B60L 2240/423* (2013.01); *B60L 2240/547* (2013.01)

(58) Field of Classification Search
CPC ................ B60L 7/18; B60L 2240/421; B60L 2240/423; B60L 2240/547; B60L 2220/44; B60L 2220/46; B60L 7/26; B60L 15/32; B60L 7/10; B60L 2220/42; B60L 2240/42; Y02T 10/62; B60K 7/0007
See application file for complete search history.

(56) References Cited

U.S. PATENT DOCUMENTS 6,155,365 A 12/2000 Boberb
2004/0263099 A1 12/2004 Maslov et al.
(Continued)

FOREIGN PATENT DOCUMENTS

GB 2508665 A 6/2014
WO 2013088554 A1 6/2013

OTHER PUBLICATIONS

Extended European Search Report of European Patent Application No. 23179934.7, Date of Mailing Dec. 8, 2023, 14 pages.
Italian Search Report for Application No. 102022000012946; Filing Date: Jun. 20, 2022; Date of Mailing—Feb. 1, 2023, 10 pages.

* cited by examiner

*Primary Examiner* — James J Lee
*Assistant Examiner* — Alexander George Matta
(74) *Attorney, Agent, or Firm* — CANTOR COLBURN LLP

(57) ABSTRACT

A motor-vehicle, comprising a first and a second wheel, a third and a fourth wheel, a first and a second reversible electric machine connected to the first and second wheel; a third and a fourth reversible electric machine connected to the third and fourth wheel; and a rechargeable electrical power source; a control unit programmed to: process electrical power values available for the regenerative engine brake simulation based on the amount of electrical power still storable in the source and on first operating parameters of the motor vehicle; communicate said available power values to the respective first, second, third and fourth electric machine and receive, from them, values of a first, second, third and fourth torque available for the regenerative engine brake simulation associated with second parameters of the electric machines; and cause the first, second, third and fourth electric machine to implement a respective first, second, third and fourth braking torque acting upon the respective wheels.

9 Claims, 6 Drawing Sheets

(56) References Cited

U.S. PATENT DOCUMENTS

2012/0109483 A1* 5/2012 O'Dea .................. B60T 8/1755 903/903
2013/0162009 A1* 6/2013 Mitts ......................... B60L 7/26 303/3
2018/0361856 A1 12/2018 Zhao et al.
2019/0275994 A1 9/2019 Zhao et al.
2020/0339081 A1* 10/2020 Suzuki ...................... B60T 8/17
2021/0252983 A1* 8/2021 Nahrwold ............... B60L 58/12
2022/0024306 A1 1/2022 O'Rourke et al.
2023/0322195 A1* 10/2023 Kaneko ..................... B60L 7/26 701/70

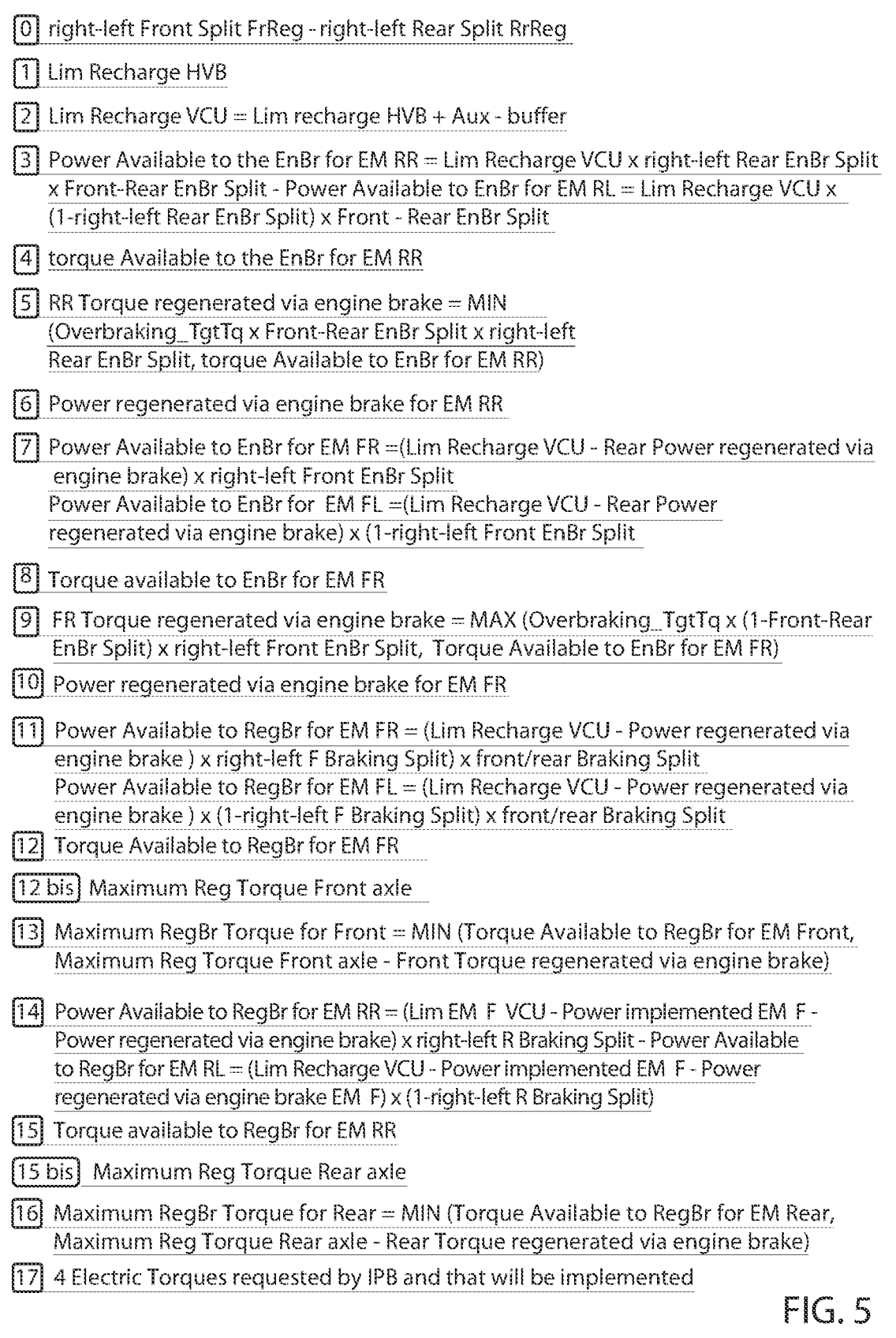

[0] right-left Front Split FrReg - right-left Rear Split RrReg

[1] Lim Recharge HVB

[2] Lim Recharge VCU = Lim recharge HVB + Aux - buffer

[3] Power Available to the EnBr for EM RR = Lim Recharge VCU x right-left Rear EnBr Split x Front-Rear EnBr Split - Power Available to EnBr for EM RL = Lim Recharge VCU x (1-right-left Rear EnBr Split) x Front - Rear EnBr Split

[4] torque Available to the EnBr for EM RR

[5] RR Torque regenerated via engine brake = MIN (Overbraking_TgtTq x Front-Rear EnBr Split x right-left Rear EnBr Split, torque Available to EnBr for EM RR)

[6] Power regenerated via engine brake for EM RR

[7] Power Available to EnBr for EM FR =(Lim Recharge VCU - Rear Power regenerated via engine brake) x right-left Front EnBr Split
Power Available to EnBr for EM FL =(Lim Recharge VCU - Rear Power regenerated via engine brake) x (1-right-left Front EnBr Split

[8] Torque available to EnBr for EM FR

[9] FR Torque regenerated via engine brake = MAX (Overbraking_TgtTq x (1-Front-Rear EnBr Split) x right-left Front EnBr Split, Torque Available to EnBr for EM FR)

[10] Power regenerated via engine brake for EM FR

[11] Power Available to RegBr for EM FR = (Lim Recharge VCU - Power regenerated via engine brake ) x right-left F Braking Split) x front/rear Braking Split
Power Available to RegBr for EM FL = (Lim Recharge VCU - Power regenerated via engine brake ) x (1-right-left F Braking Split) x front/rear Braking Split

[12] Torque Available to RegBr for EM FR

[12 bis] Maximum Reg Torque Front axle

[13] Maximum RegBr Torque for Front = MIN (Torque Available to RegBr for EM Front, Maximum Reg Torque Front axle - Front Torque regenerated via engine brake)

[14] Power Available to RegBr for EM RR = (Lim EM F VCU - Power implemented EM F - Power regenerated via engine brake) x right-left R Braking Split - Power Available to RegBr for EM RL = (Lim Recharge VCU - Power implemented EM F - Power regenerated via engine brake EM F) x (1-right-left R Braking Split)

[15] Torque available to RegBr for EM RR

[15 bis] Maximum Reg Torque Rear axle

[16] Maximum RegBr Torque for Rear = MIN (Torque Available to RegBr for EM Rear, Maximum Reg Torque Rear axle - Rear Torque regenerated via engine brake)

[17] 4 Electric Torques requested by IPB and that will be implemented

FIG. 5

METHOD FOR ELECTRIC VEHICLE SIMULATING COMBUSTION ENGINE BRAKING

CROSS-REFERENCE TO RELATED APPLICATIONS

This patent application claims priority from Italian patent application no. 102022000012946 filed on Jun. 20, 2022, the entire disclosure of which is incorporated herein by reference.

TECHNICAL FIELD

The invention relates to a motor vehicle and to a method to control a plurality of electric machines of the motor vehicle.

More in detail, the invention relates to a motor vehicle with a drive system provided with at least two electric motors exclusively powered by an electric battery and lacking heat engines.

BACKGROUND

Said drive system is commonly known as Battery Electric Vehicle (BEV).

Motor vehicles are known, which comprise:

- a plurality of electric machines associated with respective wheels;
- a high-voltage battery electrically connected to the electric machines;
- a brake pedal, which can be operated by a driver in order to generate a braking torque acting upon the wheels; and
- an accelerator pedal, which can be operated by the driver in order to increase a torque acting upon the wheels.

Known motor vehicles further comprise:

- a control unit, which is operatively connected to the accelerator pedal and to the electric machines;
- a hydraulic braking system, which can be operated in order to generate hydraulic braking torques acting upon the wheels and is operatively connected to the brake pedal; and
- a brake control unit of the "brake by wire" kind, which is designed to control the braking system and is operatively connected to the control unit and the braking system.

The electric machines are, in a known manner, reversible, which means that they can operate both as electric motors and as electric generators.

When the accelerator pedal is operated, the electric machines operate as electric motors, namely they are electrically powered by the battery and generate respective torques acting upon the wheels.

When they operate as electric generators, the electric machines convert a share of the kinetic energy of the motor vehicle into an electric current that becomes available to the battery.

Said electric current charges the high-voltage electric battery or powers high-voltage auxiliary loads, carrying out what is commonly known in the industry as "regenerative braking".

When the brake pedal is operated, the brake control unit establishes a braking torque value to be exerted upon the wheels.

In particular, the brake control unit operates the braking system so as to exert a first share of the braking torque and the control unit operates the electric machines as electric generators, so as to generate a remaining second share of the braking torque.

When the accelerator pedal is released, the control unit processes the entire braking torque value. In other words, the first share is zero and the second share corresponds to the entire braking torque.

Said braking torque value is not necessary to meet a driver's request, but simulates the braking torque normally generated for the wheels of a motor vehicle provided with a heat engine following the release of the accelerator pedal and the drag of the heat engine.

In other words, said braking torque is generated with the aim of providing the driver with a driving sensation that is similar to the one that he/she would have with a traditional motor vehicle provided with a heat engine.

The electrical power that can still be stored in the battery constitutes a limit exceeding the value of the braking torque generated by means of the electric machines operated as electric generators.

For this reason, in known solutions, the braking system, for safety reasons, is sized so that it can deliver all the braking torque normally requested by the driver during the normal operation of the motor vehicle.

In order words, the braking system is sized as if there were no possibility or a substantially very small possibility of "regenerative braking".

In the industry there is a strong need to increase, as much as possible, the second share of braking torque generated by means of the electric machines in each operating condition of the motor vehicle.

This, first of all, with the purpose of increasing, as much as possible, the charging of the battery obtained through "regenerative braking" and the consequent range of the motor vehicle with no need to charge the battery with power sources that are external to the motor vehicle, such as for example charging outlets.

Secondly, the increase in the second share of braking torque determines a corresponding decrease in the first share of braking torque requested to the traditional braking system, given the same request of the driver, thus allowing for a decrease in the maximum quantity of heat energy to be dissipated by the braking system and in the wear phenomena affecting the braking system itself, with evident advantages in terms of reduction of spaces, weights and maintenance costs.

Furthermore, the second share of braking torque has to be increased respecting given parameters of distribution of said braking torque between a front axle formed by the front wheels and a rear axle formed by the rear wheels and between the two left/right wheels of the same front/rear axle.

Finally, there is the need to respect the regeneration limits of the high-voltage battery and of the single electric machines, even in the most critical dynamic manoeuvres.

SUMMARY

The object of the invention is to provide a motor vehicle, which is capable of fulfilling at least one of the needs discussed above.

The aforesaid object is reached by the invention, as it relates to a motor vehicle as defined in claim 1.

Furthermore, the invention relates to a method to control a plurality of electric machines of the motor vehicle.

BRIEF DESCRIPTION OF THE DRAWINGS

The invention will be best understood upon perusal of the following detailed description of a preferred embodiment, which is provided by way of non-limiting example, with reference to the accompanying drawings, wherein:

FIG. 5 explains the numbers used for the operating steps in FIG. 4; and

DESCRIPTION OF EMBODIMENTS

Figure 1:
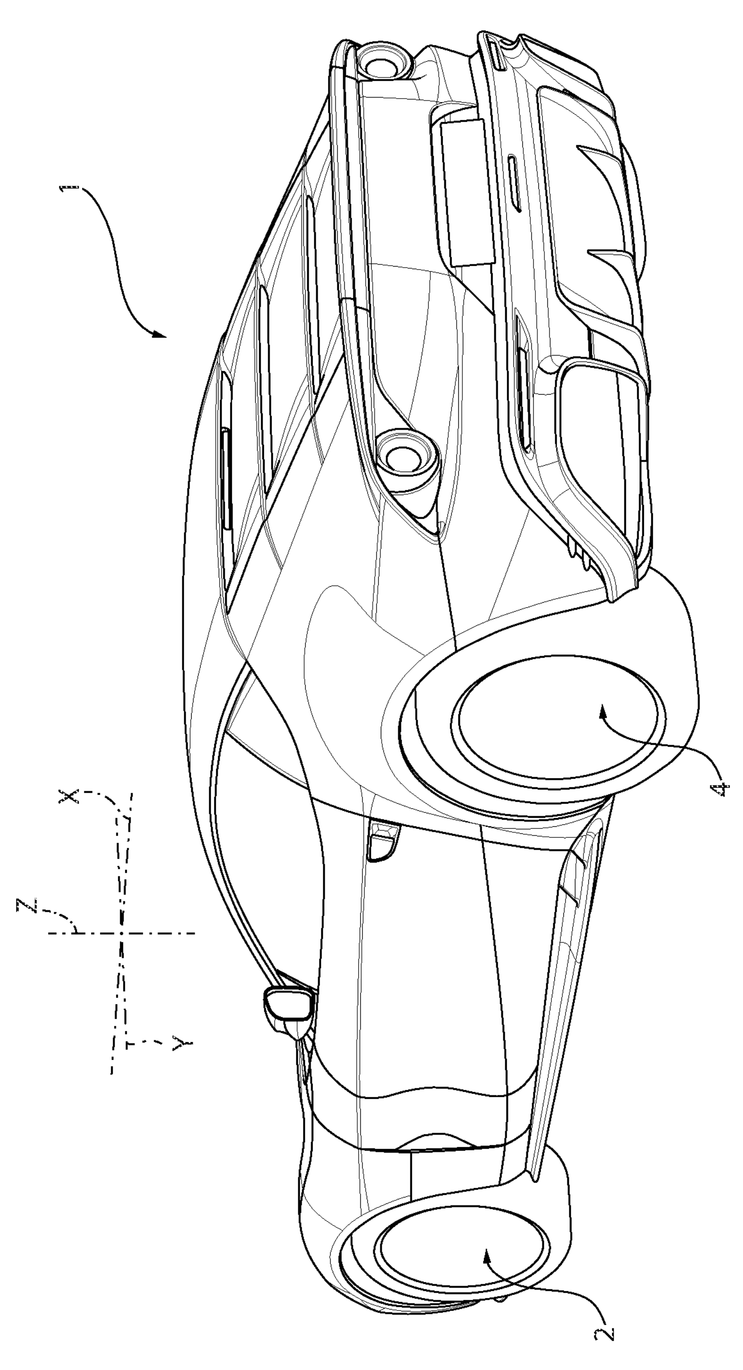
FIG. 1 is a perspective view of a motor vehicle according to the invention.

With reference to the accompanying Figures, number 1 indicates a motor vehicle, in particular an electric motor vehicle, which, therefore, lacks heat engines.

Hereinafter, expressions such as "at the top", "at the bottom", "at the front", "at the back" and others similar to them are used with reference to normal forward moving conditions of the motor vehicle 1.

Furthermore, it is possible to define:

- a longitudinal axis X integral to the motor vehicle 1, which, in use, is horizontal and parallel to a normal forward moving direction of the motor vehicle 1;
- a transverse axis X integral to the vehicle 1, which, in use, is horizontal and orthogonal to the axis X; and
- an axis Z integral to the vehicle 1, which, in use, is vertical and orthogonal to the axes X, Y.

More in detail, the motor vehicle 1 comprises:

- a pair of front wheels 2, 3, a left one and a right one, respectively, forming a front axle 11;
- a pair of rear wheels 4, 5, a left one and a right one, respectively, forming a rear axle 12;
- a brake pedal 7, which can be operated by the driver in order to exert a braking torque upon at least some of the wheels 2, 3, 4, 5; and
- an accelerator pedal 8, which can be operated by the driver in order to exert a torque upon at least some of the wheels 2, 3, 4, 5.

The motor vehicle 1 further comprises:

- a pair of electric machines FL, FR operatively connected to respective wheels 2, 3; and
- a pair of electric machines RL, RR operatively connected to the wheels 4, 5;
- a power source, for example a high-voltage battery 6, electrically connected to the electric machines RL, RR, FL, FR and to auxiliary systems of the motor vehicle 1; and
- a control unit VCU operatively connected to the battery 6, to the pedals 7, 8 and to the electric machines RL, RR, FL, FR.

Figure 2:
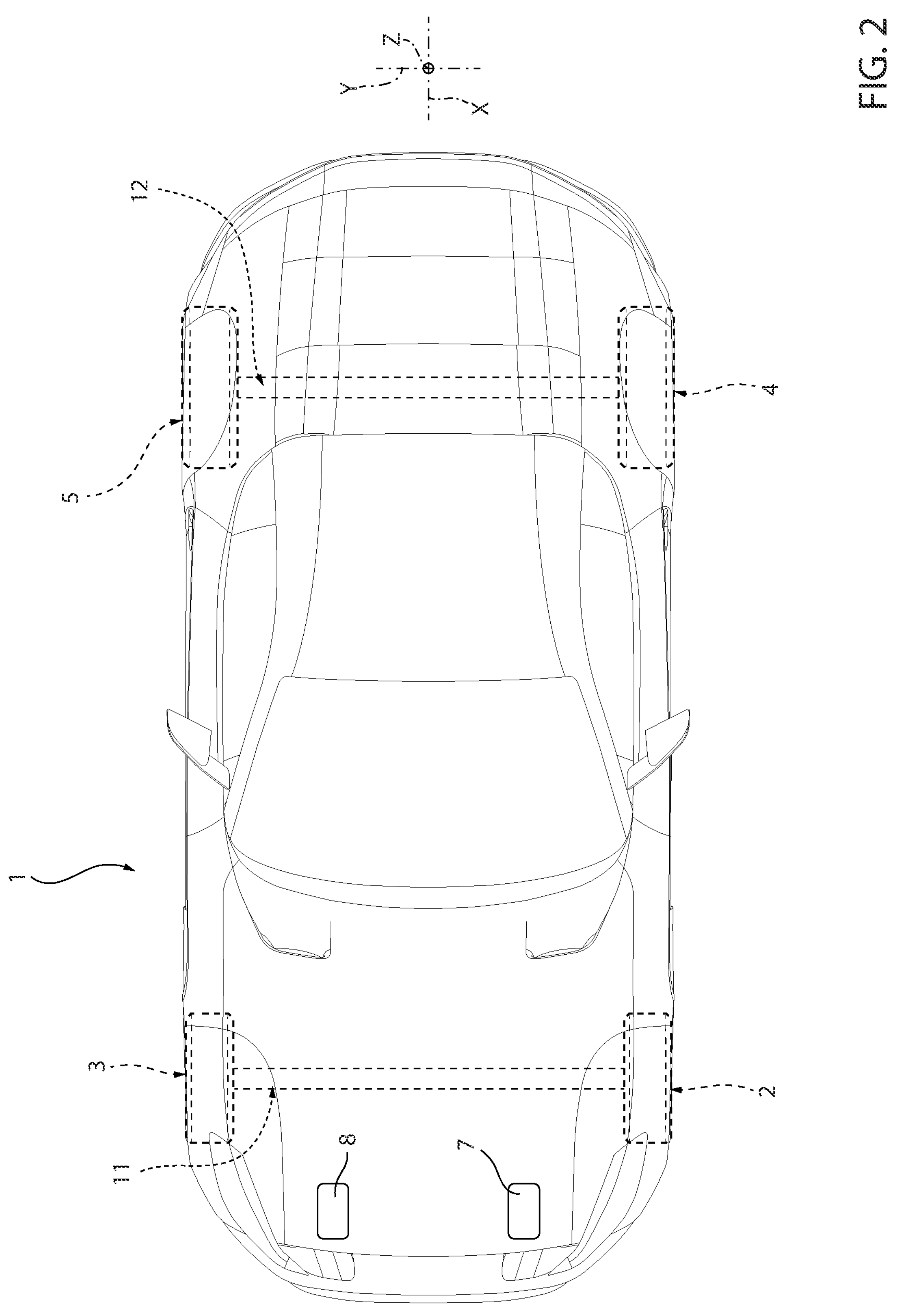
FIG. 2 is a top view of the motor vehicle of FIG. 1 with parts removed for greater clarity.

The motor vehicle 1 further comprises:

- a "brake by wire" brake control unit IPB operatively connected to the pedals 7, 8 and to the control unit VCU; and
- a braking system 10 (only schematically shown in FIG. 2) operatively connected to the brake control unit IPB and capable of being controlled by the brake control unit IPB so as to generate hydraulic braking torques acting upon the wheels 2, 3, 4, 5.

The brake control unit IPB causes the braking system 10 to generate the hydraulic braking torque following the activation of the pedal 7 or when the pedal 7 is deactivated in order to ensure a certain level of stability of the vehicle 1.

The braking system 10 generates the hydraulic braking torque through heat dissipation via friction by means of pads and respective discs carried by the wheels 2, 3, 4, 5.

The electric machines RL, RR, FL, FR are reversible and can be operated as:

- electric motors capable of absorbing power from the battery 6 and of generating a torque acting upon the wheels 2, 3, 4, 5, in case of activation of the pedal 8;
- electric generators capable of converting the kinetic energy of the wheels 2, 3, 4, 5 into an electric current that becomes available to the battery 6, in case of activation of the pedal 7.

When they are used as electric generators, the electric machines RL, RR, FL, FR generate the electric braking torque acting upon the respective wheels 4, 5, 2, 3.

More in particular, the control unit VCU is programmed to have the electric machines RL, RR, FL, FR operated as electric generators actuate:

- a first, second, third, and fourth torque associated with respective first shares of the electric braking torque acting upon the respective wheels 4, 5, 2, 3, in case of release of the pedal 8 by the driver, so as to give the driver the simulated feeling of an "engine brake" that is typical of a motor vehicle with a heat engine following the release of the accelerator pedal; and
- a fifth, sixth, seventh and eighth torque associated with respective second shares of the electric braking torque acting upon the respective wheels 2, 3, 4, 5, in case of activation of the pedal 7 by the driver.

Hereinafter, the condition of generation of the first, second, third and fourth torque by means of the electric machines RL, RR, FL, FR, in order to provide the driver with the simulated feeling of an "engine brake", is indicated, for the sake of brevity, as "regenerative engine brake simulation".

The condition of generation of the fifth, sixth, seventh and eighth torque by means of the electric machines RL, RR, FL, FR, in order to at least partly carry out the command imparted to the pedal 7, is indicated, for the sake of brevity, as "regenerative braking".

The control unit VCU is advantageously programmed, in case of release of the pedal 8, to:

- process values of a first, second, third and fourth electrical power available for the regenerative engine brake simulation Power available to EnBr for EM RL; Power available to EnBr for EM RR; Power available to EnBr for EM FL; Power available to EnBr for EM FR for respective electric machines RL, RR, FL, FR based on an amount of electrical power still storable Lim Recharge VCU in the battery 6 and on first operating parameters right-left Rear EnBr Split, right-left Rear EnBr Split;
- communicate the first, second, third and fourth electrical power available for the regenerative simulation Power available to EnBr for EM RL; Power available to EnBr for EM RR; Power available to EnBr for EM FL; Power available to EnBr for EM FR to the respective electric machines RL, RR, FL, FR and receive from said first, second, third and fourth electric machines RL, RR, FL, FR respective values of a first, second, third and fourth available torque Torque Available to EnBr for EM RL; Torque Available to EnBr for EM RR; Torque Available to EnBr for EM FL; Torque Available to EnBr for EM FR for the regenerative engine brake simulation associated with second parameters of the respective electric machines RL, RR, FL, FR themselves;

process a first, second, third and fourth torque to be implemented RL Torque regenerated via engine brake; RR Torque regenerated via engine brake; FL Torque regenerated via engine brake; FR Torque regenerated via engine brake for the respective said first, second, third and fourth electric machine RL, RR, FL, FR;

each first, second, third and fourth torque to be implemented RL Torque regenerated via engine brake; RR Torque regenerated via engine brake; FL Torque regenerated via engine brake; FR Torque regenerated via engine brake for the respective first, second, third and fourth electric machine RL, RR, FL, FR being associated with the corresponding available values of a first, second, third and fourth torque Torque Available to EnBr for EM RL; Torque Available to EnBr for EM RR; Torque Available to EnBr for EM FL; Torque Available to EnBr for EM FR for the regenerative engine brake simulation.

It should be pointed out that the control unit VCU processes the values of the first, second, third and fourth torque to be implemented by means of the respective electric machines RL, RR, FL, FR autonomously from the brake control unit IPB, in case of regenerative engine brake simulation.

As discussed more in detail below, the control unit VCU is programmed to process the values of the fifth, sixth, seventh and eighth torque to be regenerated for the regenerative braking by means of the respective electric machines RL, RR, FL, FR also based on the electrical power regenerated by the electric machines RL, RR, FL, FR for the regenerative engine brake simulation.

The control unit VCU is programmed to receive from the brake control unit IPB:

- a parameter Front-Rear Engine Brake Split and left-right Engine Brake Split;
- a parameter Front-Rear Braking Split, left-right F Braking Split and left-right R Braking Split.

The parameters Front-Rear Engine Brake Split and left-right Engine Brake Split depend, in a non-limiting manner, on the following sub-parameters:

- yaw momentum around the axis Z desired on the motor vehicle 1;
- driving style of the motor vehicle 1,
- vertical load parallel to the axis Z and acting upon each wheel 2, 3, 4, 5; and
- maximum braking torque acting upon the wheels 2, 3, 4, 5, which does not affect the stability of the motor vehicle 1.

The parameters Front-Rear Braking Split, left-right F Braking Split and left-right R Braking Split depend, in a non-limiting manner, on the following sub-parameters:

- asphalt grip conditions;
- vertical load parallel to the axis Z and acting upon each wheel 2, 3, 4, 5;
- acceleration requested by the driver parallel to the axis Y; and
- possible limitation to the longitudinal acceleration value on the axis Y.

The parameters Front-Rear Braking Split and left-right Braking Split are updated in a dynamic manner over time, as the operating conditions on which they depend change.

Figure 6:
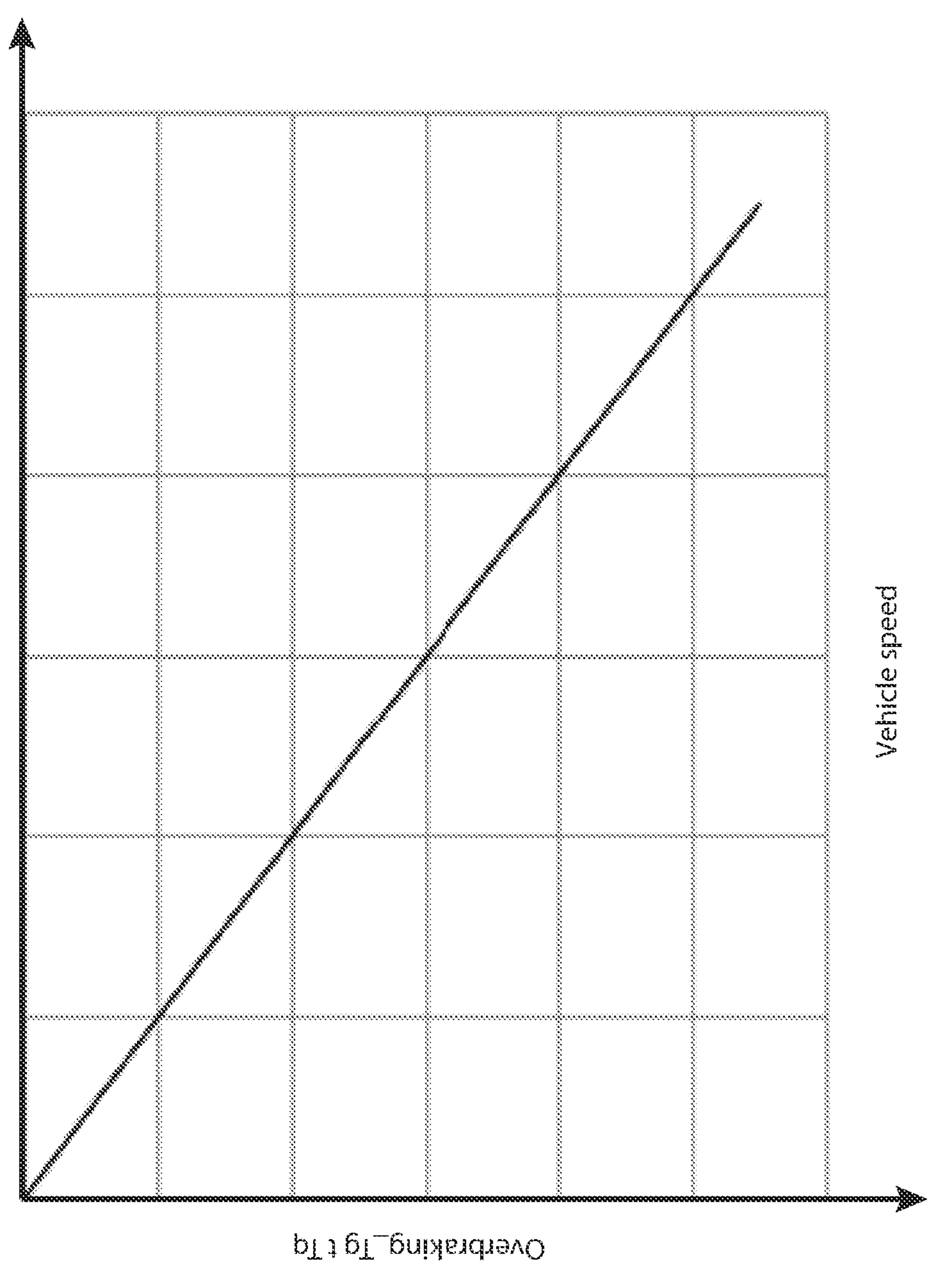
FIG. 6 shows an adjustment diagram used in the operating steps of FIGS. 3 and 4.

The control unit VCU further has, in its memory (FIG. 6), a table associating the value of a parameter Overbraking_TgtTq corresponding to a target braking torque value for the regenerative engine brake simulation with a value of the forward speed of the motor vehicle 1.

Furthermore, the control unit VCU receives, in real time, the value of the electrical power currently regenerated by the electric machines RL, RR, FL, FR.

The brake control unit IPB has, in its memory, the parameters left-right Front RegBr Split and left-right Rear RegBr Split, which dynamically depend, over time, on the operating parameters of the motor vehicle 1.

Figure 3:
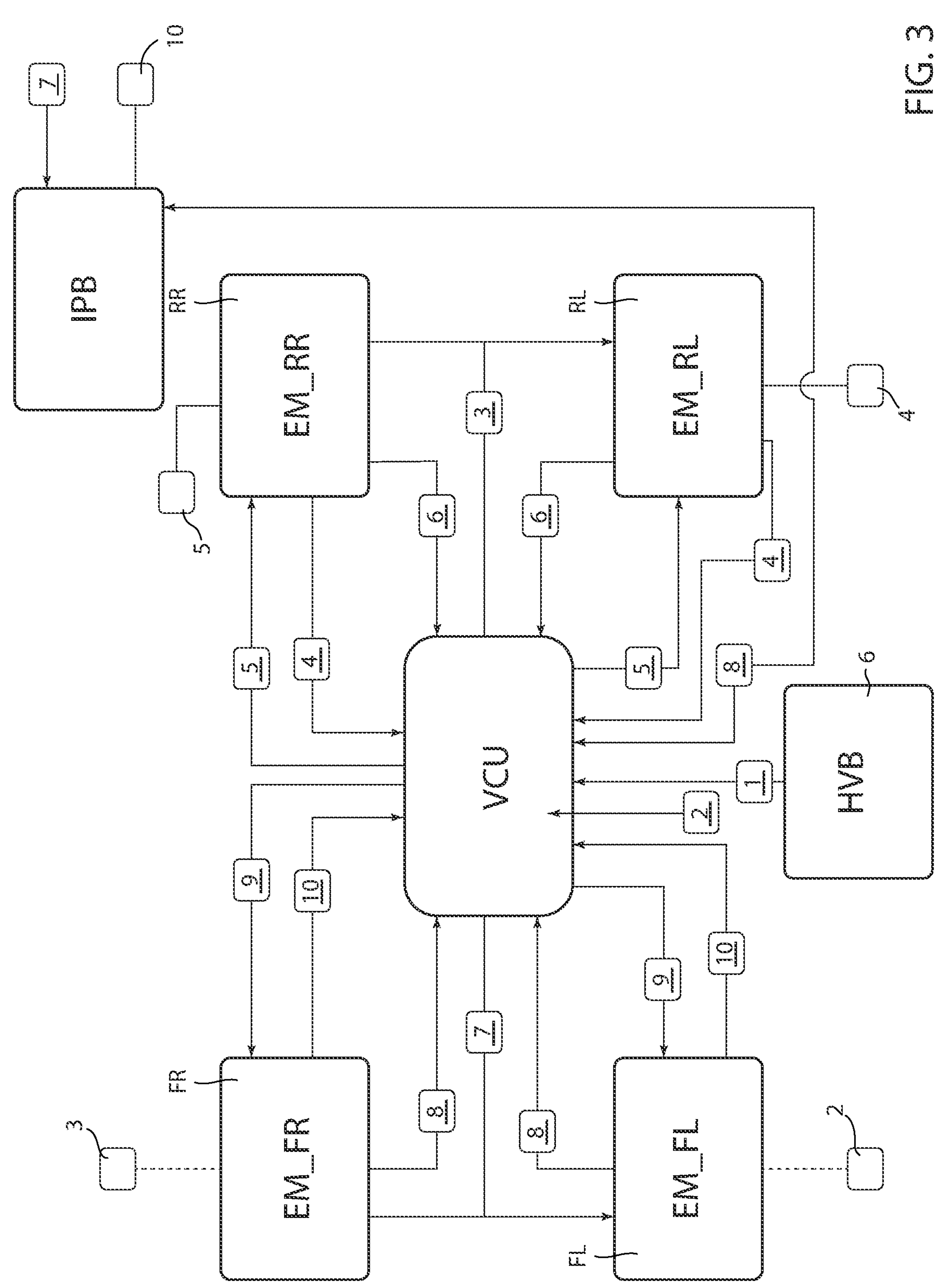
FIGS. 3 and 4 schematically show further components of the motor vehicle of FIGS. 1 and 2 and the respective operating steps.
Figure 4:
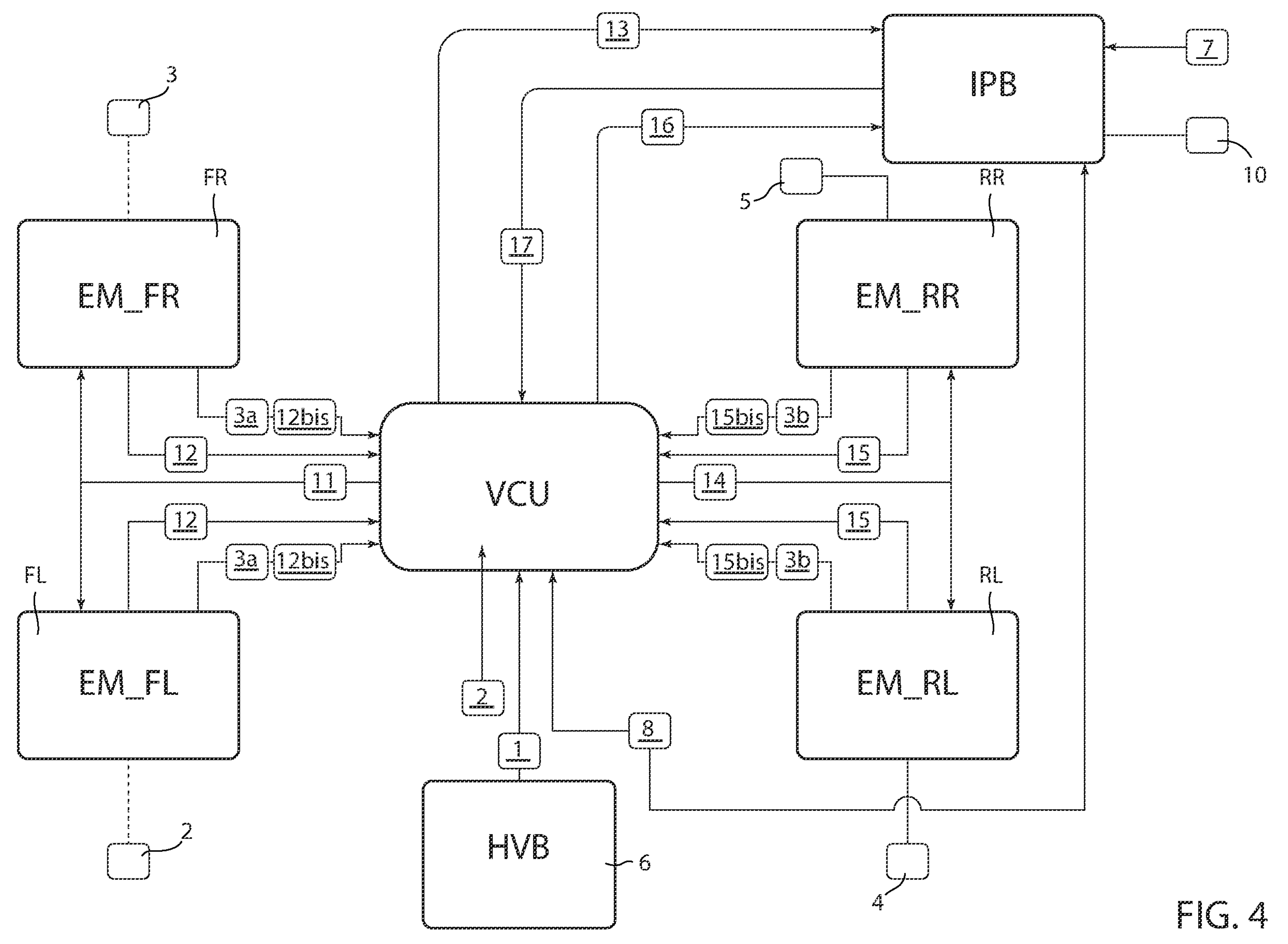

More in detail and with reference to FIG. 3, the control unit VCU receives from the pedal 8 a signal corresponding to the fact that the pedal 8 was deactivated.

The control unit VCU further receives, as an input, the value Lim Recharge HVB corresponding to the maximum value of the electrical power that can be stored in the battery 6 (step 1).

The control unit VCU is programmed (step 2) to process the value Lim Recharge VCU corresponding to the maximum electrical power that can be regenerated according to formula (1):

$$\text{Lim Recharge } HVB\text{+Aux}-\text{buffer} \qquad (1),$$

wherein:

- Lim Recharge HVB is the maximum electrical power that can be stored in the battery 6;
- Aux is the electrical power absorbed by the auxiliary systems in absolute value; and
- Buffer is a safety value having a positive sign.

The control unit VCU is programmed (step 3) to process the values of the first and of the second electrical power Power available to EnBr for EM RL; Power available to EnBr for EM RR available for the regenerative engine brake simulation for the electric machines RL, RR based on the following formulas (2), (3):

$$\text{Electrical Power Available for the regenerative Engine Brake simulation for electric machine } RL\text{=Lim Recharge } VCU\text{*(1−Right-left Rear EnBr Split)*Front-Rear EnBr Split} \qquad (2).$$

$$\text{Electrical Power Available for the regenerative Engine Brake simulation for electric machine } RR\text{=Lim Recharge } VCU\text{*Right-left Rear EnBr Split*Front-Rear EnBr Split.} \qquad (3)$$

The control unit VCU is programmed to:

- communicate to each electric machine RL, RR the respective values of the first and second electrical power available for the regenerative engine brake simulation calculated in step (3); and
- receive from each electric machine RL, RR the respective values of the first and second torque available for the regenerative engine brake simulation (step 4), processed based on the aforesaid second parameters.

Said second parameters correspond, in the specific case shown herein, to the angular speed of the electric machines RL, RR and to the respective efficiencies of conversion of the first and second electrical power communicated by the control unit VCU into mechanical power available to the wheels 4, 5.

It should be pointed out that the values of the first and second torque available for the regenerative engine brake simulation (step 4) are processed by the respective electric machines RR, RL for they comprise respective angular speed sensors and have, in their memory, respective values of the conversion efficiencies.

The control unit is further programmed to process (step the value of the first and second torque regenerated for the regenerative engine brake simulation by the electric machines RL, RR according to formulas (4), (5):

First torque regenerated for the regenerative engine brake simulation by the electric machine *RL*=MIN (Overbraking_TgtTq*Front-Rear EnBr Split*(1−Right-left Rear EnBr Split); First torque Available for the regenerative engine brake simulation for the electric machine *RL* (4).

Second torque regenerated for the regenerative engine brake simulation by the electric machine *RR*=MIN (Overbraking_TgtTq*Front-Rear EnBr Split*Right-left Rear EnBr Split); First torque Available for the regenerative engine brake simulation for the electric machine *RL* (5).

In formulas (4) and (5), all values are indicated in absolute value.

In other words, the control unit VCU is programmed to process, as first and second torque to be regenerated by means of the electric machines RL, RR, the first and second torque available for the electric machines RL, RR, in case they are lower than the target values stored in the control unit VCU for the current value of the forward speed of the motor vehicle 1 and are split among the wheels 2, 3, 4, 5 based on the coefficients Front-Rear EnBr Split*(1−Right-left Rear EnBr Split).

The control unit VCU is further programmed to communicate the aforesaid values of the first and second torque regenerated for the regenerative engine brake simulation by the electric machines RL, RR to the electric machines RL, RR themselves.

The electric machines RL, RR are programmed (step 6) to calculate and communicate to the control unit VCU the values of the first and second electrical power regenerated for the regenerative engine brake simulation based on the aforesaid values of the torque regenerated for the regenerative engine brake simulation by the electric machines RL, RR, on the angular speeds of the electric machines RL, RR and on the conversion efficiencies of the electric machines RL, RR.

The control unit VCU is further programmed to process the values of the third and fourth power available for the regenerative engine brake simulation for the electric machines FR, FL based on the sum of the values of the first and second electrical power regenerated for the regenerative engine brake simulation for the electric machines RR, RL calculated in step 6 (step 7).

In the specific case shown herein, the control unit VCU is programmed to process the values of the third and fourth power available for the regenerative engine brake simulation for the electric machines FR, FL by means of the following formulas:

third electrical power available for the regenerative engine brake simulation for the electric machine *FR*=(Lim Recharge *VCU*−Sum of the first and second electrical power regenerated by the machines *RR, RL* for the regenerative engine brake simulation)*Right-left Front EnBr Split) (6); and fourth electrical power available for the regenerative engine brake simulation for the electric machine *FL*=(Lim Recharge *VCU*−Sum of the first and second electrical Power regenerated by the machines *RR, RL* for the regenerative engine brake simulation)*(1−Right-left Front EnBr Split)) (7).

The control unit VCU is further programmed to:

communicate to each electric machine FR, FL the respective values of the third and fourth electrical power available for the regenerative engine brake simulation calculated in step (7); and receive from each electric machine FR, FL the respective values of the third and fourth torque available for the regenerative engine brake simulation (step 8), processed based on the angular speeds of the electric machines FR, FL and on the respective conversion efficiencies.

The control unit is further programmed to process (step 9) the value of the third and fourth torque regenerated for the regenerative engine brake simulation by the electric machines FR, FL according to the formulas:

Third torque regenerated for the regenerative engine brake simulation by the electric machine *FR*=MIN(Overbraking_TgtTq×(1−Front-Rear EnBr Split)*Right-left Front EnBr Split, Third Torque Available for the regenerative engine brake simulation for the electric machine *FR*) (10);

Fourth torque regenerated for the regenerative engine brake simulation by the electric machine *FL*=MIN(Overbraking_TgtTq*Front-Rear EnBr Split*(1−Right-left Rear EnBr Split); Fourth Torque Available for the regenerative engine brake simulation for the electric machine *RL*); (11).

The electric machines FL, FR are programmed (step 10) to calculate and communicate to the control unit VCU the values of the third and fourth electrical power regenerated for the regenerative engine brake simulation based on the aforesaid values of the third and fourth torque regenerated for the regenerative engine brake simulation by the electric machines FR, FL and on the second parameters, in the specific case shown herein the angular speeds and the conversion efficiencies of the electric machines FR, FL.

The aforesaid first, second, third and fourth torque regenerated for the regenerative engine brake simulation by the electric machine RL, RR, FL, FR correspond to the first, second, third and fourth torque to be implemented for the regenerative engine brake simulation, respectively.

It should be pointed out that steps (7)-(10) are carried out simultaneously with steps (3)-(6).

The control unit VCU is further programmed to process the values of the fifth, sixth, seventh and eighth power available for the regenerative braking for the electric machines RL, RR, FL, FR.

More in particular, the control unit VCU is programmed to process the values of the fifth and of the sixth power available for the regenerative braking for the electric machines FL, FR based on the following formulas (step 11):

Sixth power available for the Regenerative Braking for the electric machine *FR*=(Lim Recharge *VCU*−Sum of the first, second, third and fourth power regenerated for the regenerative engine brake simulation)*right-left Braking Split) *front/rear Braking Split (12); and Fifth power available for the Regenerative Braking for the electric machine *FL*=(Lim Recharge *VCU*−Sum of the first, second, third and fourth power regenerated for the regenerative engine brake simulation)*(1−right-left *F* Braking Split) *front/rear Braking Split (13).

The control unit VCU is further programmed to:

communicate to the electric machines FL, FR respective values of the fifth and sixth power available for the Regenerative Braking; and receive from the electric machines FL, FR respective values of the fifth and sixth torque available for the regenerative braking (step 12).

Furthermore, the electric machines FR, FL communicate to the control unit VCU the value of the respective available maximum torques and the control unit VCU is programmed to process the maximum torque for the regenerative braking for the front axle 11 (step 12bis), according to the formula:

Maximum torque available for the regenerative braking for the front axle 11=(Lim recharge *VCU*/conversion efficiency of the electric machine *FR*/angular speed of the electric machine *FR*)+(Lim recharge *VCU*/conversion efficiency of the electric machine *FL*/angular speed of the electric machine *FL*) (14).

The control unit VCU is programmed to process a sum of the fifth and of the sixth torque available for the regenerative braking for the electric machines FL, FR.

The control unit VCU is programmed to calculate and communicate to the brake control unit IPB the maximum value of the torque available for the regenerative braking for the front axle 11 (step 13).

In particular, said maximum value of the torque available for the regenerative braking for the front axle 11 is calculated with the formula:

Maximum value of the torque available for the Regenerative Braking for the front axle 11=MIN(Sum of the fifth and of the sixth torque available for the regenerative braking for the electric machines *FL, FR*; Maximum torque available for the regenerative braking for the front axle 11−Sum of the third and of the fourth torque available for the regenerative engine brake simulation for the electric machines *FL, FR*).

The control unit VCU is further programmed to process the values of the seventh and eighth power available for the regenerative braking for the electric machines RL, RR, based on the following formulas (15) and (16), wherein the values in brackets have to be considered in absolute value (step 14);

Eighth power Available for the Regenerative Braking for the electric machine *RR*=(Lim Recharge *VCU*−power value currently regenerated by means of the electric machines *FL, FR*−Sum of the first and second power regenerated for the regenerative engine brake simulation)*right-left Rear Braking Split* (15); and Seventh power available for the Regenerative Braking for the electric machine *RL*=(Lim Recharge *VCU*−power value currently regenerated by means of the electric machines *FL, FR*−Sum of the first and second power regenerated for the regenerative engine brake simulation)*(1−right-left *R* Braking Split) (16).

The control unit VCU is further programmed to:

communicate to the electric machines RL, RR respective values of the seventh and eighth power available for the Regenerative Braking; and receive from the electric machines RL, RR respective values of the seventh and eighth torque available for the regenerative braking (step 15).

The electric machines RL, RR further communicate the value of the maximum torque available for the regenerative braking for the rear axle 12 (step 15bis).

The control unit VCU is programmed to process a sum of the seventh and eighth torque available for the regenerative braking for the electric machines RL, RR.

In particular, said maximum value of the torque available for the regenerative braking for the rear axle 12 is calculated by the control unit VCU with the formula:

Maximum torque available for the regenerative braking for the rear axle 12=(Lim recharge *VCU*/conversion efficiency of the electric machine *RR*/angular speed of the electric machine *RR*)+(Lim recharge *VCU*/conversion efficiency of the electric machine *RL*/angular speed of the electric machine *RL*) (17).

The control unit VCU is further programmed to calculate and communicate to the brake control unit IPB the maximum value of the torque available for the regenerative braking for the rear axle 12 (step 16).

Maximum value of the torque available for the Regenerative Braking for the rear axle 12=MIN (Torque available for the regenerative braking on the rear axle 12; Maximum torque available for the regenerative braking for the rear axle 12−Sum of the first and second torque regenerated on the rear axle 12 for the regenerative engine brake simulation) (18).

The brake control unit IBP is programmed to process:

the values of the fifth and sixth torque regenerated for the regenerative braking for the electric machines FL, FR, based on the maximum value of the torque available for the Regenerative Braking for the front axle 11 calculated in step 13) and on a third parameter corresponding to the right-left Front Split coefficient; and the values of the seventh and eighth torque regenerated for the regenerative braking for the electric machines RR, RL, based on the maximum value of the torque available for the Regenerative Braking for the rear axle 12 calculated in step 16) and on a fourth parameter corresponding to a right-left Rear Split coefficient; and communicate said values of the fifth, sixth, seventh and eighth regenerated torque to the control unit VCU.

The control unit VCU is programmed to cause:

the electric machine RL to implement a first electric torque corresponding to the sum of the first torque to be implemented for the regenerative engine brake simulation and of the fifth regenerated torque and to exert a corresponding braking torque upon the wheel 4;

the electric machine RR to implement a second electric torque corresponding to the sum of the second torque to be implemented for the regenerative engine brake simulation and of the sixth regenerated torque and to exert a corresponding braking torque upon the wheel 5;

the electric machine FR to implement a third electric torque corresponding to the sum of the third torque to be implemented for the regenerative simulation and of the seventh regenerated torque and to exert a corresponding braking torque upon the wheel 2; and the electric machine RR to implement a fourth electric torque corresponding to the sum of the fourth torque to be implemented for the regenerative simulation and of the eighth regenerated torque and to exert a corresponding braking torque upon the wheel 3.

The sum of the first, second, third, fourth, fifth, sixth, seventh, eighth electric torque corresponds to the electric braking torque.

The brake control unit IPB is programmed to cause the braking system 10 to generate a braking torque corresponding to the difference between the braking torque requested by the driver by means of the pedal 7 and the sum of the fifth, sixth, seventh and eight torque regenerated for the regenerative braking requested by the brake control unit IPB.

In other words, the brake control unit IPB makes up for the amount of braking torque requested by the driver which cannot be obtained through regenerative braking.

The operation of the motor vehicle 1 is described hereinafter starting from an operating condition in which the driver activates the pedal 8 in order to request desired torque values to be delivered to wheels 2, 3, 4, 5.

In this condition, the battery 6 electrically powers the electric machines RL, RR, FL, FR, which generate respective torques acting upon the corresponding wheels 4, 5, 2, 3.

In case the driver releases the pedal 8, the electronic control unit VCU carries out steps 1-10) described above.

At the end of the aforesaid steps 1-10), the control unit VCU has processed the values of the first, second, third and fourth torque regenerated for the engine brake simulation of the respective electric machines RL, RR, FL, FR.

In case the driver also activates the pedal 7, the control unit VCU carries out steps 11-17) described above and the brake control unit IPB communicates to the control unit VCU values of the fifth, sixth, seventh and eighth torque regenerated for the regenerative braking for the respective electric machines RL, RR, FL, FR.

At the point, the control unit VCU causes:

the electric machine RL to implement a first electric torque corresponding to the sum of the first torque to be implemented for the regenerative engine brake simulation and of the fifth regenerated torque and to exert a corresponding braking torque upon the wheel 4;

the electric machine RR to implement a second electric torque corresponding to the sum of the second torque to be implemented for the regenerative engine brake simulation and of the sixth regenerated torque and to exert a corresponding braking torque upon the wheel 5;

the electric machine FR to implement a third electric torque corresponding to the sum of the third torque to be implemented for the regenerative simulation and of the seventh regenerated torque and to exert a corresponding braking torque upon the wheel 2; and the electric machine RR to implement a fourth electric torque corresponding to the sum of the fourth torque to be implemented for the regenerative simulation and of the eighth regenerated torque and to exert a corresponding braking torque upon the wheel 3.

The sum of the first, second, third, fourth, fifth, sixth, seventh, eighth electric torque corresponds to the electric braking torque.

Finally, the brake control unit IPB causes the braking system 10 to generate a braking torque corresponding to the difference between the braking torque requested by the driver by means of the pedal 7 and the sum of the fifth, sixth, seventh and eight torque regenerated for the regenerative braking requested by the brake control unit IPB.

The disclosure above reveals evident advantages that can be obtained with the invention.

More in detail, the control unit VCU is programmed, in case of release of the pedal 8, to:

process values of the first, second, third and fourth electrical power available for the regenerative engine brake simulation Power available to EnBr for EM RL; Power available to EnBr for EM RR; Power available to EnBr for EM FL; Power available to EnBr for EM FR for respective electric machines RL, RR, FL, FR based on an amount of electrical power still storable Lim Recharge VCU in the battery 6 and on first operating parameters Right-left Rear EnBr Split, Right-left Rear EnBr Split;

communicate the first, second, third and fourth electrical power available for the regenerative simulation Power available to EnBr for EM RL; Power available to EnBr for EM RR; Power available to EnBr for EM FL; Power available to EnBr for EM FR to the respective electric machines RL, RR, FL, FR and receive from said first, second, third and fourth electric machines RL, RR, FL, FR respective values of a first, second, third and fourth available torque Torque Available to EnBr for EM RL; Torque Available to EnBr for EM RR; Torque Available to EnBr for EM FL; Torque Available to EnBr for EM FR for the regenerative engine brake simulation associated with second parameters of the respective electric machines RL, RR, FL, FR themselves; and process a first, second, third and fourth torque to be implemented RL Torque regenerated via engine brake; RR Torque regenerated via engine brake; FL Torque regenerated via engine brake; FR Torque regenerated via engine brake for the respective said first, second, third and fourth electric machine RL, RR, FL, FR.

In this way, in case of regenerative engine brake simulation following the release of the pedal 8, the first, second, third and fourth torque to be implemented RL Torque regenerated via engine brake; RR Torque regenerated via engine brake; FL Torque regenerated via engine brake; FR Torque regenerated via engine brake are processed based on the actual amount of electrical power Lim Recharge VCU still storable in the battery 6, based on desired dynamic features for the split of the power to the wheels 4, 5, 2, 3 represented by the coefficients Right-left Rear EnBr Split, Right-left Rear EnBr Split and based on the conversion efficiency and the number of revolutions of the electric machines RL, RR, FL, FR.

Thanks to this, the quantity of electrical power regenerated in the battery 6 and, consequently, the values of the first, second, third and fourth implemented electrical torque can be maximized, respecting the limits of the battery 6 and of the electric machines RL, RR, FL, FR, in case of the regenerative simulation of the engine brake effect following the release of the pedal 8.

As a consequence, on the one hand, it is possible to maximize the amount of electrical power to be made available to the electric machines RL, RR, FL, FR operated as electric motors and, on the other hand, it is possible to reduce the amount of heat to be removed from the braking system 10 as well as the wear phenomena affecting the braking system 10.

Similarly, in case of activation of the brake pedal 7, the brake control unit processes the fifth, sixth, seventh, eighth torque to be implemented for the electric machines RL, RR, FL, FR based on the actual power Lim Recharge VCU still storable in the battery 6, based on the desired dynamic features for the split of the power to the wheels 4, 5, 2, 3 represented by front/rear Braking Split, right-left F Braking Split; right-left R Braking Split and on the power currently implemented for the regenerative engine brake simulation.

Therefore, said values of the fifth, sixth, seventh, eighth torque implemented for the electric machines RL, RR, FL, FR in case of activation of the brake pedal 7 are also processed respecting the electrical power still storable in the battery 6 and the features of the electric machines RL, RR, FL, FR as well as the desired dynamic features of the motor vehicle 1, in case of activation of the pedal 7.

This further helps maximize the amount of electrical power that will be available to the electric machines RL, RR, FL, FR operated as electric motors.

This leads to a reduction of the braking torques and, hence, of the quantity of heat that has to be dissipated by the braking system 10 and of the wear effects affecting the braking system 10, even in case of activation of the pedal 7.

Finally, the control unit VCU is programmed to process the third and fourth value of the electrical power available for the regenerative engine brake simulation Power available to EnBr for EM FL; Power available to EnBr for EM FR for the electric machines FL, FR acting upon the axle 11, based on the electrical power regenerated on the axle 12 for the regenerative engine brake simulation.

In other words, in case of release of the pedal 8, the control unit VCU processes the first and second value of the electrical power available for the regenerative engine brake simulation Power available to EnBr for EM RL; Power available to EnBr for EM RR for the electric machines FL, FR operating on the axle 12 with priority relative to the aforesaid third and fourth value of the electrical power available for the regenerative engine brake simulation Power available to EnBr for EM FL; Power available to EnBr for EM FR for the electric machines FL, FR operating on the axle 11.

On the contrary, in case of activation of the pedal 7, the control unit VCU is programmed to process the fifth and sixth value of the electrical power available for the regenerative braking Power available to RegBr for EM RL; Power available to RegBr for EM RR for the electric machines RL, RR acting upon the axle 12, based on the power currently implemented on the axle 11.

In other words, in case of activation of the pedal 7, the control unit VCU processes the seventh and eighth value of the electrical power available for the regenerative braking Power available to RegBr for EM FL; Power available to RegBr for EM FR for the electric machines FL, FR operating on the axis 11 with priority relative to the aforesaid fifth and sixth value of the electrical power available for the regenerative braking Power available to RegBr for EM RL; Power available to RegBr for EM RR for the electric machines RL, RR operating on the axis 12.

Therefore, the aforesaid first, second, third, fourth, fifth, sixth, seventh and eighth power can be split among the wheels 4, 5, 2, 3 in a way that is more adherent to the normal behaviour of motor vehicles in case of release of the pedal 8 or activation of the pedal 7.

Finally, the motor vehicle 1 and the electric machine control method according to the invention can clearly be subjected to changes and variations, which, though, do not go beyond the scope of protection set forth in the appended claims.

The invention claimed is:

1. A motor-vehicle, comprising:

a first and a second wheel forming a first axle of said motor-vehicle arranged at a rear of the motor vehicle in use;

a third and a fourth wheel forming a second axle of said motor-vehicle arranged at a front of the motor vehicle in use;

a first and a second electric machine reversible and operatively connected respectively with said first and second wheels;

a third and a fourth electric machine reversible and operatively connected respectively with said third and fourth wheels; and an electrical power source that is rechargeable and electrically connected with said first, second, third and fourth electric machines;

each of said first, second, third and fourth electric machines being actuatable as an electric motor to exert respectively a first and second, third and fourth driving torque respectively on said first, second, third and fourth wheels, and as an electric generator to use at least a portion of the kinetic energies of respective said first and second, third and fourth wheels and to generate an electrical current that recharges, in use, said electrical power source;

said motor-vehicle further comprising:

a first accelerator command actuatable by a driver to request an acceleration of said motor-vehicle;

a second brake command actuatable by a driver to request a deceleration of said motor-vehicle;

a control unit programmed, upon a release of said first command, to:

process values of a first, second, third and fourth electrical power available for a regenerative simulation of an engine brake for respective said first, second, third and fourth electric machines based on an amount of electrical power still storable in said electrical power source and first operating parameters (of said motor-vehicle;

communicate said first, second, third, and fourth electrical power available for the regenerative simulation to the respective said first, second, third and fourth electric machines and receive from said first, second, third and fourth electric machines respective values of a first, second, third and fourth available torque for the regenerative simulation of said engine brake associated with second operating parameters of respective said first, second, third and fourth electric machines themselves;

process a first, second, third and fourth torque to be implemented for the regenerative simulation of the engine brake for the respective first, second, third and fourth electric machines;

each said first, second, third and fourth torque to be implemented for the respective first, second, third and fourth electric machines being associated with corresponding said values of the first, second, third and fourth available torque for the regenerative simulation of said engine brake;

wherein said control unit is further programmed to:

store a table that associates a target torque that simulates the effect of the engine brake with a forward speed of said motor-vehicle;

distribute said target torque over said first, second, third and fourth electric machines, so as to process respective first, second, third and fourth target torques; and process said first, second, third and fourth torques to be implemented as a minimum value between absolute values of each said first, second, third and fourth target torques and the corresponding said first, second, third and fourth available torques for the regenerative simulation of said engine brake.

2. The motor-vehicle according to claim 1, wherein said control unit is further programmed to:

communicate said first, second, third and fourth torques to be implemented to the respective said first, second, third and fourth electric machines;

receive from said first, second, third and fourth electric machines the respective first, second, third and fourth electrical power to be regenerated;

process values of said third and fourth electrical power available for the regenerative braking for said third and fourth electric machines, based also on a sum of said first and second electrical power regenerated) by the respective said first and second electric machines the regenerative simulation of said engine brake.

3. The motor-vehicle according to claim 2, wherein said control unit is further programmed, upon actuating a second command, to:

process a sum of the first, second, third and fourth electrical power regenerated by said first, second, third and fourth electric machines for the regenerative simulation of said engine brake; and process values of a seventh and eighth available electrical power for the regenerative braking for respective said third and fourth electric machines based on the amount of electrical power still storable in said electrical power source, of third operating parameters of said motor-vehicle and of said sum of said first, second, third and fourth electrical power regenerated by said first, second, third and fourth electric machines for the regenerative simulation of said engine brake.

4. The motor-vehicle according to claim 3, wherein said control unit is programmed to:

receive a current value of a sum of the third and fourth electrical power implemented by said third and fourth electric machines; and process the values of a fifth and sixth electrical power available for the regenerative braking for respective said first, second electric machines, based on the amount of electrical power still storable in said electrical power source, of said sum of said third and fourth electrical power implemented by said third and fourth electric machines, and of the sum of the first, second, third and fourth power regenerated by said first, second, third and fourth electric machines the regenerative simulation of said engine brake.

5. The motor-vehicle according to claim 4, wherein said first, second, third and fourth electric machines are programmed to:

receive from said control unit, at input, respective said fifth, sixth, seventh and eighth electrical power available for the regenerative braking;

process a first and second available torque for the regenerative braking, based on the respective said fifth and sixth electrical power and said second operating parameters of said first and second electric machines;

process a third and a fourth available torque for the regenerative braking, based on respective said seventh and eighth electrical power and said second operating parameters of said third and fourth second electric machines;

process a first maximum regenerable torque for said first axle, based at least on said amount of electrical power still storable in said electrical power source, and on an angular velocity and an electromechanical efficiency of said first and second electric machines;

process a second maximum regenerable torque for said second axle, based at least on said amount of electrical power still storable in said electrical power source, and on an angular velocity and an electromechanical efficiency of said third and fourth electric machines;

process a first maximum regenerable torque for said first axle as the minimum value between the absolute values of:

said first available torque for the regenerative braking for said first axle equal to the sum of said first and second available torques for the regenerative braking, and the difference between a maximum torque regenerated at said first axle for said first axle and a sum of said first and second torques to be implemented for the regenerative simulation of said engine brake; and process a second maximum regenerable torque for said second axle as the minimum value between the absolute values of:

said second available torque for the regenerative braking for said second axle (equal to the sum of said third and a fourth available torque for the regenerative braking, and the difference between said second maximum available torque for the regenerative braking for said second axle and a sum of said third and fourth regenerated torques for the regenerative simulation of said engine brake.

6. The motor-vehicle according to claim 5, further comprising:

a braking device adapted to exert a braking torque by friction on said first, second, third and fourth wheels;

a brake control unit programmed, in the case of activation of said second command, to:

receive said first maximum regenerable torque for the regenerative braking by said first and second electric machines and said second maximum regenerative torque for the regenerative braking by said third and fourth electric machines;

process a fifth and a sixth torque implemented for the regenerative braking for the respective said first and second electric machines, based on said first maximum regenerable torque for the regenerative braking;

process a seventh and eighth torque implemented for the regenerative braking for the respective third and fourth electric machines, based on said second maximum regenerable torque for the regenerative braking;

communicate said fifth, sixth, seventh, and eighth torques to be implemented for the regenerative braking to said control unit; and process a braking torque value for said braking device based on said command set, in use, on said second pedal and said first, second, third, fourth, fifth, sixth, seventh and eighth torque values implemented for said regenerative braking.

7. The motor-vehicle according to claim 6, wherein said control unit is further programmed to command:

said first electric machine to sum said first torque to be implemented for the simulation of said engine brake and the fifth torque to be implemented for the regenerative braking;

said second electric machine to sum said second torque to be implemented for the simulation of said engine brake and the sixth torque to be implemented for the regenerative braking;

said third electric machine to sum said third torque to be implemented for the simulation of said engine brake and said seventh torque to be implemented for the regenerative braking; and said fourth electric machine to implement said fourth torque to be implemented for the simulation of said engine brake and said eighth torque to be implemented for the regenerative braking.

8. The motor-vehicle according to claim 1, wherein the motor vehicle is without a heat engine.

9. A method to control a first, second, third and fourth reversible electric machine of a motor-vehicle, comprising:

store a table that associates a target torque that simulates the effect of the engine brake with a forward speed of said motor-vehicle;

operatively connecting a first and a second electric machine respectively with a first and a second wheel of said motor-vehicle forming a first axle of said motor-vehicle arranged at a rear of the motor vehicle in use;

operatively connecting a third and a fourth electric machine respectively with a third and a fourth wheel of said motor-vehicle forming a second axle of said motor-vehicle arranged at a front of the motor vehicle in use;

electrically connecting a rechargeable electrical power source electrically connected with said first, second, third and fourth electric machines;

operating each said first, second, third and fourth electric machines as an electric motor to exert respectively a first and second, third and fourth driving torque respectively on said first, second, third and fourth wheels, in the case of actuating a first accelerator command of said motor-vehicle;

operating each said first, second, third and fourth electric machines as an electric generator to use at least a portion of the kinetic energies of respective said first, second, third and fourth wheels and to generate an electrical current that recharges, in use, said rechargeable electrical power source, upon actuating a second brake command of said motor-vehicle;

wherein the method further comprises, upon release of said first command, of:

processing values of a first, second, third and fourth electrical power available for a regenerative simulation of an engine brake for respective said first, second, third and fourth electric machines based on an amount of electrical power still storable in said rechargeable electrical power source and first operating parameters of said motor-vehicle, upon release of said first command;

communicate said first, second, third and fourth electrical power available for the regenerative simulation to the respective said first, second, third and fourth electric machines and receive from said first, second, third and fourth electric machines respective values of a first, second, third and fourth available torque for the regenerative simulation of said engine brake associated with second operating parameters of respective said first, second, third and fourth electric machines themselves; and distribute said target torque over said first, second, third and fourth electric machines, so as to process respective first, second, third and fourth target torques; and process a first, second, third and fourth torque to be implemented for the regenerative simulation of the engine brake for the respective first, second, third and fourth electric machines;

wherein said first, second, third and fourth torques are to be implemented as a minimum value between absolute values of each said first, second, third and fourth target torques and the corresponding said first, second, third and fourth available torques for the regenerative simulation of said engine brake;

each said first, second, third and fourth torque to be implemented for the respective first, second, third and fourth electric machines being associated with the corresponding said first, second, third and fourth available torque values for the regenerative simulation of said engine brake.

* * * * *